(12) United States Patent
Samarao et al.

(10) Patent No.: US 9,423,303 B2
(45) Date of Patent: Aug. 23, 2016

(54) MEMS INFRARED SENSOR INCLUDING A PLASMONIC LENS

(71) Applicant: Robert Bosch GmbH, Stuttgart (DE)

(72) Inventors: Ashwin Samarao, Mountain View, CA (US); Gary O'Brien, Palo Alto, CA (US); Ando Feyh, Palo Alto, CA (US); Gary Yama, Mountain View, CA (US); Fabian Purkl, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 14/136,808

(22) Filed: Dec. 20, 2013

(65) Prior Publication Data

US 2014/0294043 A1 Oct. 2, 2014

Related U.S. Application Data

(63) Continuation-in-part of application No. 14/091,550, filed on Nov. 27, 2013.

(60) Provisional application No. 61/745,571, filed on Dec. 22, 2012, provisional application No. 61/731,995, filed on Nov. 30, 2012.

(51) Int. Cl.
| | |
|---|---|
| *G01J 5/02* | (2006.01) |
| *G01J 5/10* | (2006.01) |
| *G01J 5/20* | (2006.01) |
| *G01J 5/04* | (2006.01) |
| *G01J 5/08* | (2006.01) |

(52) U.S. Cl.
CPC ............. *G01J 5/024* (2013.01); *G01J 5/045* (2013.01); *G01J 5/0815* (2013.01); *G01J 5/0837* (2013.01); *G01J 5/0856* (2013.01); *G01J 5/10* (2013.01); *G01J 5/20* (2013.01)

(58) Field of Classification Search
CPC ........................................................ G01J 5/024
See application file for complete search history.

(56) References Cited

U.S. PATENT DOCUMENTS 4,224,520 A * 9/1980 Greene ................ H01L 31/095
  250/338.4
5,242,224 A * 9/1993 Yoshioka .............. G01J 5/0022
  165/8

(Continued)

FOREIGN PATENT DOCUMENTS

WO 2008114148 A2 9/2008

OTHER PUBLICATIONS

International Search Report and Written Opinion corresponding to PCT Application No. PCT/US2013/077187, mailed Mar. 17, 2014 (9 pages).

*Primary Examiner* — David Porta
*Assistant Examiner* — Jeremy S Valentiner
(74) *Attorney, Agent, or Firm* — Maginot Moore & Beck LLP

(57) ABSTRACT

A portable thermal imaging system includes a portable housing configured to be carried by a user, a bolometer sensor assembly supported by the housing and including an array of thermal sensor elements and at least one plasmonic lens, a memory including program instructions, and a processor operably connected to the memory and to the sensor, and configured to execute the program instructions to obtain signals from each of a selected set of thermal sensor elements of the array of thermal sensor elements, assign each of the obtained signals with a respective color data associated with a temperature of a sensed object, and render the color data.

16 Claims, 14 Drawing Sheets

(56) References Cited

U.S. PATENT DOCUMENTS

| | | | |
|---|---|---|---|
| 2006/0097172 A1* | 5/2006 | Park | G01J 3/36 250/338.1 |
| 2006/0118720 A1* | 6/2006 | Roman | G01J 5/06 250/332 |
| 2006/0175551 A1* | 8/2006 | Fan | G01J 5/02 250/353 |
| 2006/0289768 A1* | 12/2006 | Vallese | G01J 5/02 250/353 |
| 2007/0087311 A1* | 4/2007 | Garvey | G01J 5/00 434/21 |
| 2010/0110430 A1* | 5/2010 | Ebbesen | B82Y 20/00 356/331 |
| 2012/0147243 A1* | 6/2012 | Townsend | H04N 9/045 348/333.02 |

* cited by examiner

MEMS INFRARED SENSOR INCLUDING A PLASMONIC LENS

This application claims priority under 35 U.S.C. §119 to U.S. Provisional Application No. 61/745,571, filed on Dec. 22, 2012, and is a continuation-in-part of U.S. application Ser. No. 14/091,550, filed on Nov. 27, 2013, which claims priority under 35 U.S.C. §119 to U.S. Provisional Application No. 61/731,995, filed on Nov. 30, 2012, the disclosures of which are each incorporated herein by reference in their entirety.

FIELD

This disclosure relates generally to semiconductor sensor devices and methods of fabricating such devices.

BACKGROUND

Infrared radiation (IR) sensors are used in a variety of applications to detect infrared radiation and to provide an electrical output that is a measure of the infrared radiation incident thereon. IR sensors typically use either photonic detectors or thermal detectors for detecting the infrared radiation. Photonic detectors detect incident photons by using the energy of the photons to excite charge carriers in a material. The excitation of the material is then detected electronically. Thermal detectors also detect photons. Thermal detectors, however, use the energy of the photons to increase the temperature of a component. By measuring the change in temperature, the intensity of the photons producing the change in temperature can be determined.

Photonic detectors typically have higher sensitivity and faster response times than thermal detectors. However, photonic detectors must be cryogenically cooled in order to minimize thermal interference, thus increasing the cost, complexity, weight, and power consumption of the device. In contrast, thermal detectors operate at room temperature, thus avoiding the cooling required by photonic detector devices. As a result, thermal detector devices can typically have smaller sizes, lower costs, and lower power consumption than photonic detector devices.

One type of infrared thermal detector is a bolometer device. A bolometer device includes an absorber element for absorbing infrared radiation, a transducer element that has an electrical resistance that varies with temperature, and a substrate. In use, infrared radiation incident upon the bolometer device is absorbed by the absorber element, and the heat generated by the absorbed radiation is transferred to the transducer element. As the transducer element heats in response to the absorbed radiation, the electrical resistance of the transducer element changes in a predetermined manner. By detecting changes in the electrical resistance, a measure of the incident infrared radiation can be obtained.

Bolometer devices must first absorb incident infrared radiation to induce a change in temperature. Typically, however, infrared radiation is dispersed on the absorber as well as portions of the bolometer device that are not configured to absorb infrared radiation, such as the substrate. Accordingly, the efficiency of the bolometer device is less than 100% since the absorber is exposed to only a portion of the incident infrared radiation.

It would be desirable to focus the infrared radiation onto the absorber using a focusing device. Known devices for focusing infrared radiation, however, are very expensive and are typically made using germanium. Furthermore, the cost of known focusing devices for infrared radiation typically exceeds the cost of the bolometer by at least an order of magnitude. Accordingly, while known bolometer devices are effective, there is a constant need to increase the efficiency of bolometer devices, simplify the fabrication, and/or to decrease the production cost of such devices.

SUMMARY

According to an exemplary embodiment of the disclosure, a semiconductor device includes a substrate, a cap wafer, an absorber, and a lens layer. The substrate defines an upper surface. The cap wafer is supported by the substrate and includes a cap layer spaced apart from the substrate. The absorber extends from the upper surface and is located between the substrate and the cap layer. The lens layer is supported by the cap layer. The lens layer defines a plurality of grooves and an opening located over the absorber.

According to another exemplary embodiment of the disclosure, a method of fabricating a semiconductor device includes forming an absorber on a substrate, and supporting a cap layer over the substrate to define a cavity between the substrate and the cap layer in which the absorber is located. The method further includes forming a lens layer on the cap layer. The lens layer is spaced apart from the cavity and defines a plurality of grooves and an opening located over the absorber.

A portable thermal imaging system in a further embodiment includes a portable housing configured to be carried by a user, a bolometer sensor assembly supported by the housing and including an array of thermal sensor elements and at least one plasmonic lens, a memory including program instructions, and a processor operably connected to the memory and to the sensor, and configured to execute the program instructions to obtain signals from each of a selected set of thermal sensor elements of the array of thermal sensor elements, assign each of the obtained signals with a respective color data associated with a temperature of a sensed object, and render the color data.

A method of operating a portable thermal imaging system includes providing a portable housing configured to be carried by a user, supporting a bolometer sensor assembly with the housing, the bolometer sensor assembly including an array of thermal sensor elements and at least one plasmonic lens, obtaining signals from each of a selected set of thermal sensor elements of the array of thermal sensor elements with a processor, assigning each of the obtained signals with a respective color data associated with a temperature of a sensed object, and rendering the color data.

BRIEF DESCRIPTION OF THE DRAWINGS

The above-described features and advantages, as well as others, should become more readily apparent to those of ordinary skill in the art by reference to the following detailed description and the accompanying figures in which.

DETAILED DESCRIPTION

Figure 1:
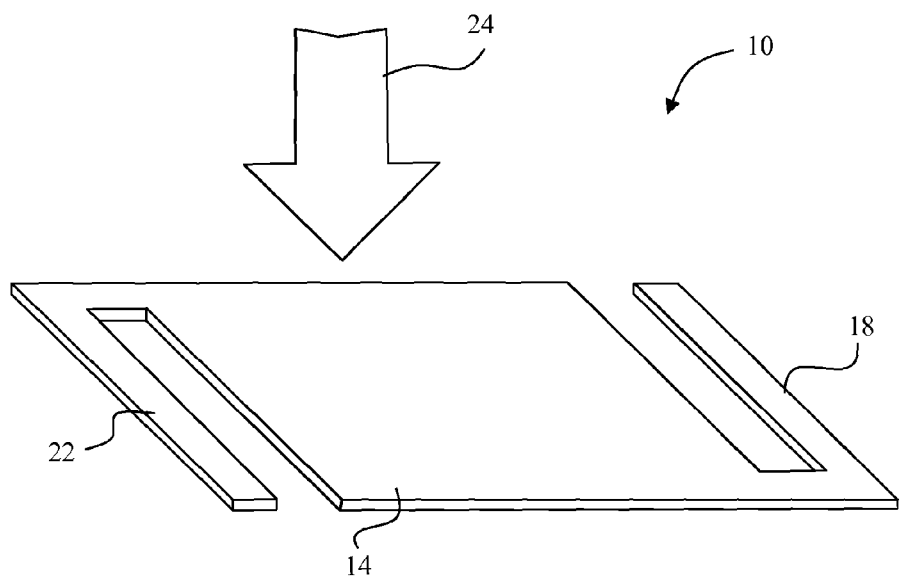
FIG. 1 is a perspective view of a prior art bolometer pixel of a bolometer device.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

As shown in FIG. 1, a prior art micro electromechanical system (MEMS) bolometer pixel 10 includes an absorber 14 and two legs 18, 22. The absorber 14 is configured to undergo an electrical change in response to absorbing infrared radiation 24 (shown schematically as a downward pointing arrow and also referred to herein as "radiation" and "IR"). When the absorber 14 is exposed to the IR 24 emitted from an object (not shown), the absorber heats up and undergoes, for example, a change in electrical resistance, which is detected using an external electrical circuit (not shown). The exemplary absorber 14 is shown as being a substantially planar rectangular element. In another embodiment, however, the absorber 14 has any desired shape and/or configuration.

The legs 18, 22 extend from the absorber 14 and are configured to be electrically connected to the external electrical circuit that monitors the electrical state of the absorber 14. In one embodiment, the external circuit is configured to generate an output that represents a temperature based on an electrical resistance of the absorber 14, as measured from the leg 18 to the leg 22.

The bolometer pixel 10, including the absorber 14 and the legs 18, 22, is typically formed from an ultra-thin layer (approximately 10 nm), of metal. Exemplary metals include, but are not limited to, vanadium oxide, platinum, and titanium. In another embodiment, the bolometer pixel 10 is formed from any desired material.

Figure 2:
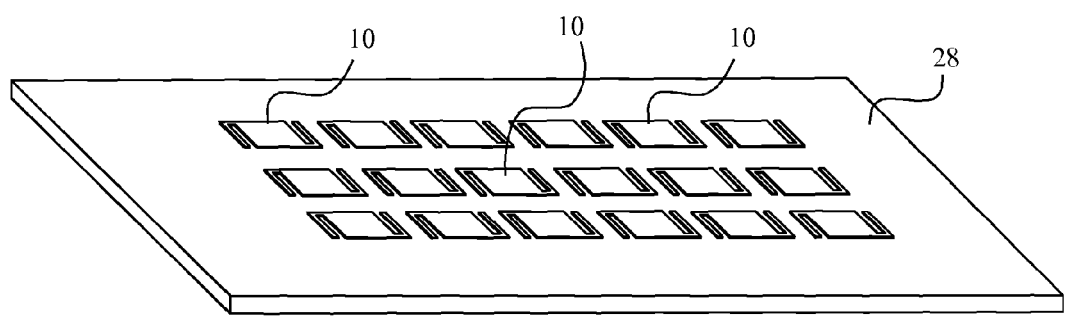
FIG. 2 is a perspective view of a prior art bolometer device including a plurality of the bolometer pixels of FIG. 1 formed on a substrate.

As shown in FIG. 2, a plurality of the bolometer pixels 10 is arranged in a focal plane array on a substrate 28. The substrate 28 is substantially planar and is also referred to herein as a "reflector" and a "reflector layer." The substrate 28 is typically formed from silicon using CMOS technology, but may be formed/made using any desired material and technology.

Figure 3:
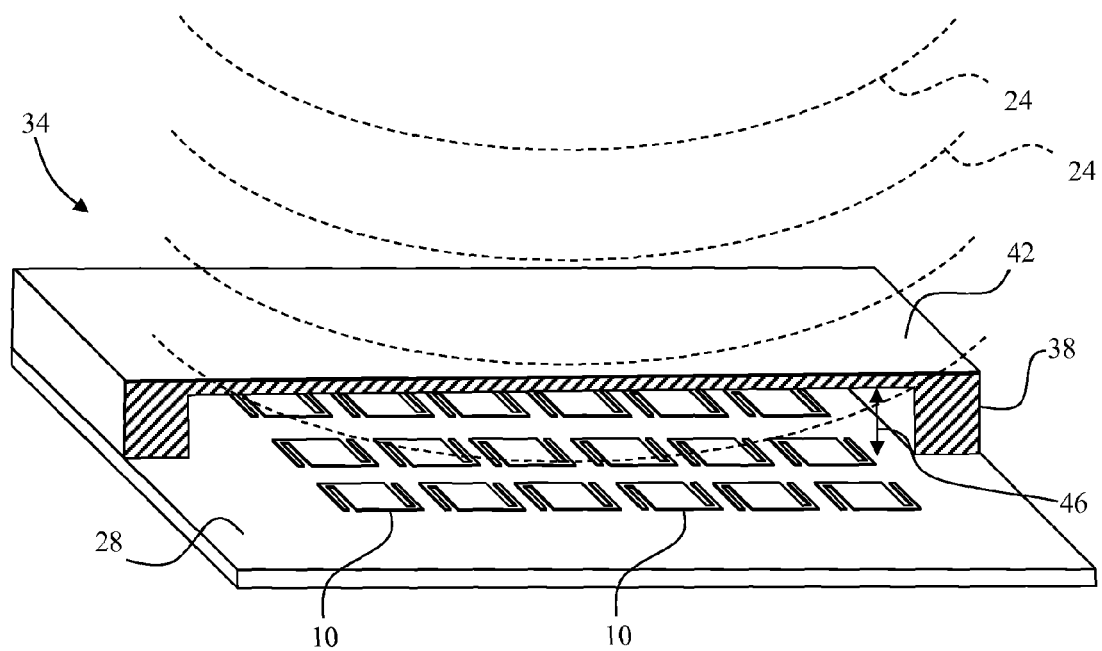
FIG. 3 is a perspective view of the bolometer device of FIG. 2 including a cap wafer formed on the substrate over the plurality of bolometer pixels.

FIG. 3 shows a typical prior art bolometer sensor assembly 34 that includes the substrate 28, the plurality of bolometer pixels 10, and a cap wafer 38. The cap wafer 38 extends from the substrate 28 and defines a cap layer 42 that is spaced apart from the bolometer pixels 10 by a distance 46. In one embodiment, the cap wafer 38 is formed from undoped or lowly doped silicon; however, the cap wafer may be formed from any desired material that is at least partially transparent to the IR 24.

The bolometer sensor assembly 34 is shown in FIG. 3 as being exposed to infrared radiation 24 that is emitted by an object (not shown). The cap wafer 38 passes most of the IR 24 through to the pixels 10. Specifically, the material of the cap wafer 38 transmits about 60% to 70% of the IR 24 through the cap layer 42. When the IR 24 passes through the cap wafer 38 it is dispersed across the pixels 10 and the substrate 28. The percentage of the IR 24 that is incident on portions of the bolometer sensor assembly 34 other than the bolometer pixels 10 is generally not used to determine the temperature of the object. This leads to an inherent inefficiency of the prior art bolometer sensor assembly 34, since only a portion of the available IR 24 is used to heat the bolometer pixels 10.

Figures 4, 5:
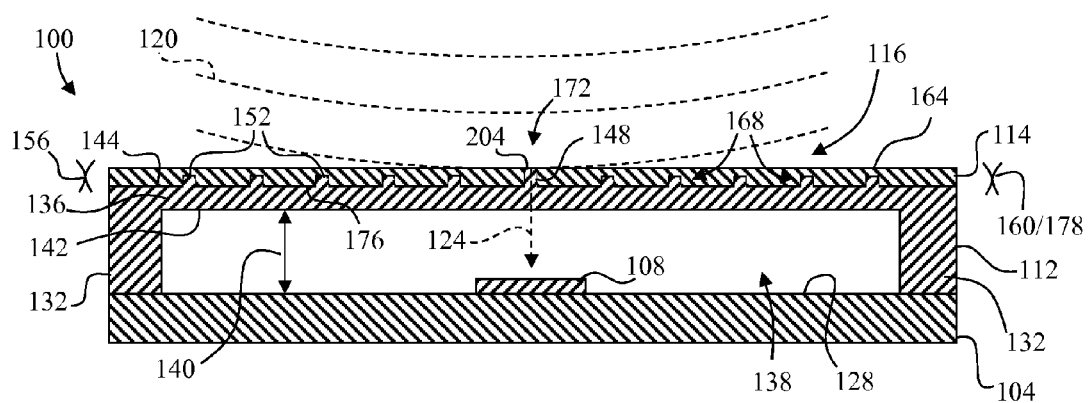
FIG. 4 is a side cross sectional view of a semiconductor sensor device, as described herein, taken along line IV-IV of FIG. 5, the semiconductor sensor device including a bolometer pixel and a lens structure defining a plurality of concentric grooves and an IR opening.
FIG. 5 is a top plan view of the semiconductor sensor device of FIG. 4, showing the plurality of concentric grooves and the bolometer pixel in broken lines.

As shown in FIG. 4, a bolometer sensor assembly 100, which is a semiconductor sensor device, includes a substrate 104, a plurality of bolometer pixels 108 (only one of which is shown), a cap wafer 112, and a lens layer 114. Infrared radiation (IR) 120 is shown as being incident on the bolometer sensor assembly 100. The lens layer 114 includes a plurality of plasmonic lens structures 116 (only one of which is shown) that are configured to focus/beam the IR 120 into an IR ray 124 that is incident directly onto the pixel 108, thereby significantly increasing the efficiency of the bolometer sensor assembly 100.

The substrate 104 is substantially planar and is also referred to herein as a "reflector" or a "reflector layer." The substrate 104 is typically formed from silicon using CMOS technology, but may be formed/made using any desired material and technology including silicon on insulator (SOI) technology.

The bolometer pixel 108, which is also referred to herein as an "absorber," is substantially identical to the bolometer pixel 10 of FIG. 1. In another embodiment, the bolometer pixel 108 is provided as any type of bolometer pixel as desired. The bolometer pixel 108 extends from an upper surface 128 of the substrate 104.

The cap wafer 112 is supported by the substrate 104 and includes a support structure 132 and a cap layer 136. The support structure 132 extends upward from the upper surface 128 of the substrate 104. The cap layer 136 extends from the support structure 136 and is spaced apart from the substrate 104 by a distance 140, such that a cavity 138 is defined between the upper surface 128 of the substrate and a lower surface 142 of the cap layer 136. The bolometer pixel 108 is located between the substrate 104 and the cap layer 136 and is at least partially located in the cavity 138. The cap layer 136 is substantially parallel to the substrate 104.

In one embodiment, the cap wafer 112 is formed from undoped or lowly doped silicon; however, the cap wafer may be formed from any desired material that is at least partially transparent to the IR 120. Furthermore, in some embodiments, the support structure 132 and the cap layer 136 are formed from different materials.

A post 148 and a plurality of ridges 152 are formed on an upper surface 144 of the cap layer 136. The post 148, which is also referred to herein as pillar, is a substantially cylindrical protuberance that extends upward (as shown in FIG. 4), away from the upper surface 144 of the cap layer 136 for a post distance 156. An exemplary post distance 156 is approximately 2.5 micrometers (2.5 µm). The post 148 defines a diameter of approximately 400 nanometers (400 nm). In another embodiment, the post 148 is any desired size and shape, such as square, rectangular, triangular, or any other desired shape including irregular shapes.

With additional reference to FIG. 5, the ridges 152 are substantially circular and are concentrically arranged on the upper surface 144 of the cap layer 136. The ridges 152, as well as the bolometer pixel 108, are shown in phantom in FIG. 5 since they are located below the lens layer 114 as viewed from above. The cap layer 136 includes five of the ridges 156, but in other embodiments the cap layer includes any desired number of ridges. Each ridge 156 extends upward (as shown in FIG. 4), away from the upper surface 144 of the cap layer 136 for a ridge distance 160 that is less than the post distance 156. In one exemplary embodiment, the ridge distance 160 is approximately one micrometer (1 µm). As illustrated, the ridges 152 are approximately evenly spaced apart from each other, but may be unevenly spaced apart in another embodiment. Furthermore, the ridges 152 may have any desired shape and configuration including non-concentric configurations.

The lens layer 114 is supported by the cap layer 136 and, in particular, is located generally above the upper surface 144 of the cap layer in the embodiment of FIG. 4. The lens layer 114 is referred to as being "generally above" the upper surface 144, since the post 148 may be considered part of the upper surface 144 and the post extends completely through the lens layer. With such an interpretation, the lens layer 114 is not "completely" above the upper surface 144, but is "generally above" the upper surface. In the illustrated embodiment, the lens layer 114 is formed on the upper surface 144 of the cap layer 136; however, in other embodiments, one or more other layers (not shown) may be positioned between the upper surface and the lens layer.

The lens layer 114 defines an upper surface 164 that is substantially planar and an opposite lower surface 176. The upper surface 164 is spaced apart from the lower surface 176 by approximately the post distance 156. Accordingly, a thickness of the lens layer 114 is approximately 2.5 micrometers (2.5 µm), in one embodiment.

The lens structure 116 of the lens layer 114 includes a plurality of grooves 168 and an IR opening 172. The grooves 168 are concentric circular grooves that are centered about the IR opening 172. The grooves 168 are defined in the lower surface 176 and are complementary in shape and size to the ridges 152 formed in/on the cap layer 136, such that the grooves are at least partially filled by the ridges (i.e. the material of the cap wafer 112). In one embodiment, the grooves 168 define a cross sectional area of approximately one square micrometer (1 µm) and are spaced apart from each other by approximately five micrometers (5 µm). The lens structure 116 includes the same number of grooves 168 as the number of ridges 152. Accordingly, the lens structure 116 includes five of the grooves 168 in the exemplary embodiment. The grooves 168 define a depth 178 that is less than the thickness of the lens layer 114.

With continued reference to FIG. 4, the IR opening 172, which is also referred to herein as an opening, a circular opening, an aperture opening, and an aperture, extends completely through the thickness of the lens layer 114, unlike the grooves 168. The IR opening 172 is positioned at approximately the center of each of the grooves 168, as shown in FIG. 5, and is located over the bolometer pixel 108. The IR opening 172 is complementary in shape and size to the post 148 and is substantially/completely filled with the post. The IR opening 172 and the post 148 are configured to be exposed to the IR 120. Depending on the configuration of the lens structure 116, the IR opening 172 may pass electromagnetic radiation outside of the infrared range.

The lens layer 114 may be formed from a "perfectly conducting material" (PCM) that is configured to prevent the passage of IR therethrough. The PCM has zero electrical resistance (i.e. is a perfect conductor) and is configured to block 100% of the IR 120 incident thereon. Accordingly, suitable materials for forming the lens layer 114 include metal, such as platinum, metallic alloys, and the like.

Figure 6:
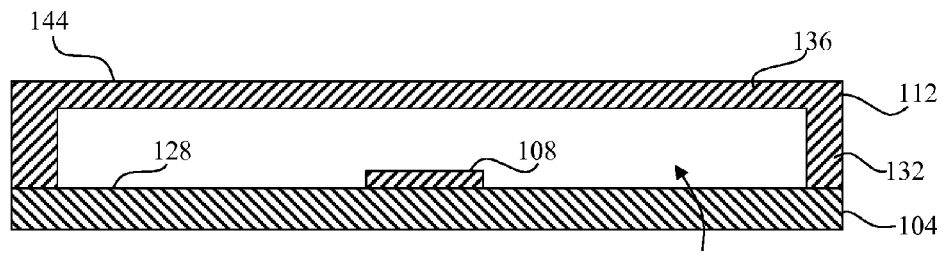
FIG. 6 is a side cross sectional view taken along a line similar to the line IV-IV of FIG. 5, showing a substrate, a bolometer pixel, and a cap wafer.

As shown in FIG. 6, a method of fabricating the bolometer sensor assembly 100 includes providing the substrate 104. Next, the bolometer pixel 108 is formed on the upper surface 128 of the substrate 104 according to any desired process. After formation of the bolometer pixel 108, the cap wafer 112 is applied/formed on the substrate 104 using any process.

Figure 7:
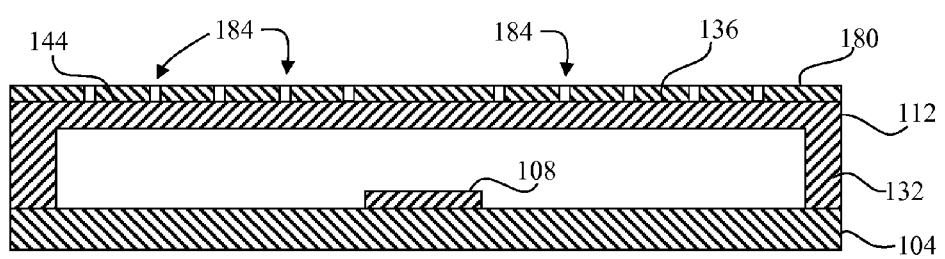
FIG. 7 is a side cross sectional view taken along a line similar to the line IV-IV of FIG. 5, showing a plurality of concentric grooves formed in a first portion of a sacrificial layer applied to the cap wafer.

Next, with reference to FIG. 7, a first portion of a sacrificial layer 180 is deposited on the upper surface 144 of the cap layer 136. The sacrificial layer 180 defines a thickness approximately equal to the ridge distance 160 (FIG. 4). The sacrificial layer 180 is formed from any suitable material.

The method further includes applying/depositing/forming/printing a mask (not shown) on the sacrificial layer 180. The mask is a resist mask, a photo mask, or the like. The mask is applied in a pattern that corresponds to the desired configuration of the ridges 152, but does not typically account for the post 148 (in this exemplary embodiment). The sacrificial layer 180 is trenched through the mask to form a plurality of concentric grooves 184. The grooves 184 are complimentary in size and shape to the ridges 152.

Figure 8:
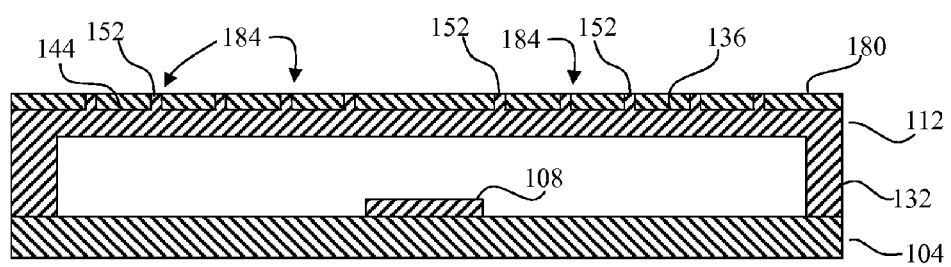
FIG. 8 is a side cross sectional view taken along a line similar to the line IV-IV of FIG. 5, showing material of the cap wafer deposited into the concentric grooves formed in the first portion of the sacrificial layer.

As shown in FIG. 8, next the material of the cap wafer 112 is deposited into the grooves 184 to form the ridges 152. After the depositing, the ridges 152 and the sacrificial layer 180 may be polished using chemical and mechanical polishing (CMP) or any other desired smoothing/polishing process.

Figure 9:
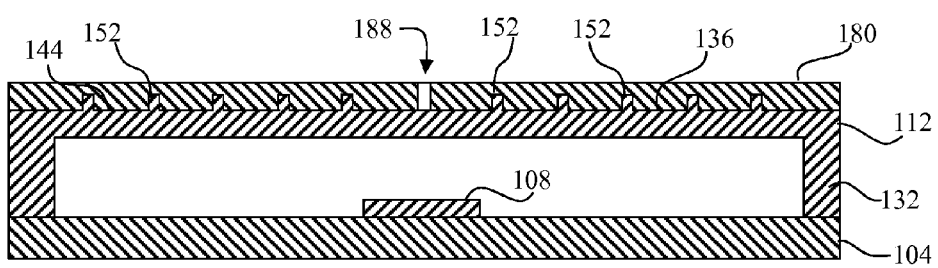
FIG. 9 is a side cross sectional view taken along a line similar to the line IV-IV of FIG. 5, showing a second portion of the sacrificial layer including a post opening formed completely through the sacrificial layer.

With reference to FIG. 9, a second portion of the sacrificial layer 180 is formed over the ridges 152. Then, another mask (not shown) is applied to the sacrificial layer 180 in a pattern that corresponds to the desired configuration of the post 148. Afterwards, the sacrificial layer 180 is trenched to form a post opening 188 that extends through the sacrificial layer.

Figure 10:
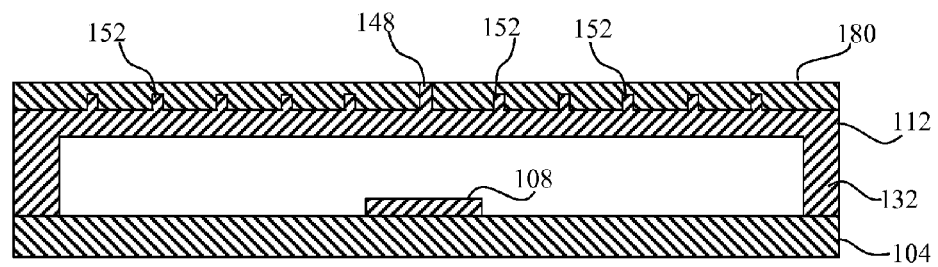
FIG. 10 is a side cross sectional view taken along a line similar to the line IV-IV of FIG. 5, showing material of the cap wafer deposited into the post opening.
Figure 11:
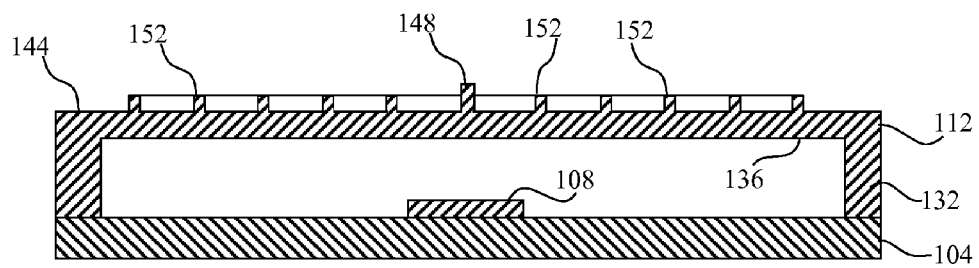
FIG. 11 is a side cross sectional view taken along a line similar to the line IV-IV of FIG. 5, showing a plurality of concentric ridges and a center post after removal of the sacrificial layer.

In FIG. 10, material of the cap wafer 112 is deposited into the post opening 188 to form the post 148. Next, as shown in FIG. 11, the sacrificial layer 180 is etched away, using any desired process. Removal of the sacrificial layer 180 exposes the post 148, the ridges 152, and the upper surface 144 of the cap layer 136.

Figure 12:
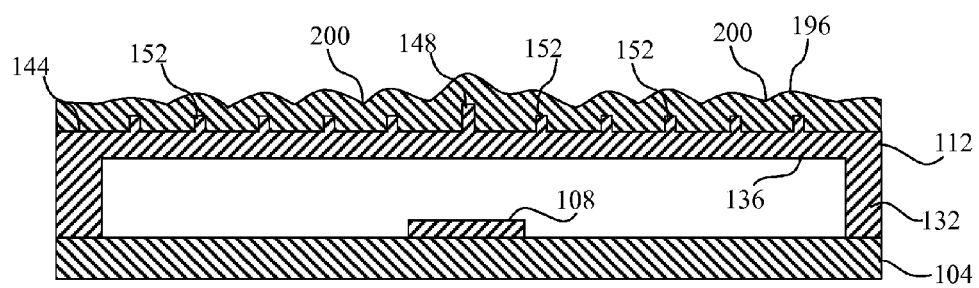
FIG. 12 is a side cross sectional view taken along a line similar to the line IV-IV of FIG. 5, showing material of the lens structure deposited over the plurality of concentric ridges and the center post.

According to FIG. 12, a conformal layer 192 of the material of the lens layer 114 (FIG. 4) is deposited onto the upper surface 144 of the cap layer 136, the post 148, and the ridges 152. In the illustrated embodiment, the conformal layer 192 is formed using a predetermined number of cycles of atomic layer deposition (ALD). The conformal layer 192 includes a plurality of curved surfaces 196 and valleys 200. The valleys 200 correspond approximately to a midpoint between the ridges 152. An apex of the curved surfaces 196 corresponds to the location of the ridges 152. The valleys 200 and the curved surfaces 196 are a consequence of the layered formation of the conformal layer 192. In another embodiment the material of the lens structure 116 is deposited using any desired process including sputtering and evaporative techniques.

Next, with further reference to FIG. 4, the conformal layer 192 is smoothed using CMP or another desired process to arrive at the smooth and flat upper surface 164 of the lens structure 116. The polishing step removes a portion of the conformal layer 192 that is in contact with a post upper surface 204, thereby uncapping the IR opening 172. After polishing, the ridges 152, however, remain buried below the upper surface 164 of the lens layer 114 and are not directly exposed to the IR 120.

In operation, the lens structure 116 focuses and/or to beams the IR 120 into an IR ray 124 that is directed onto an absorber (see, e.g., absorber 14, FIG. 1) of the bolometer pixel 108. With continued reference to FIG. 4, when the lens layer 114 is exposed to the IR 120, the lens structure 116 enables the IR to pass through the IR opening 172, but blocks the passage of the IR through all other areas of the lens layer 114. As a result of the size and shape of the grooves 168 (among other factors), the IR 120 that passes through the IR opening 172 is emitted as the focused ray of IR 124. The IR ray 124 passes through the cap layer 136 and is incident on the pixel 108. Accordingly, the lens structure 116 functions as a plasmonic lens that is configured to focus the IR 120 onto the pixel 108 instead of allowing the IR to be scattered across the substrate 104 as in the prior art bolometer sensor assembly 34 of FIG. 3. Additionally, the lens structure 116 results in more efficient absorption of the IR 120 by the pixel 108 and a higher responsively from the sensor device 100.

The lens structure 116 is configurable to pass a particular wavelength of electromagnetic radiation therethrough, typically in the infrared range. In particular, the wavelength of electromagnetic radiation that passes through the IR opening 172 is dependent on the shape of the opening 172, the diameter of the opening 172, the number of the grooves 168, and the size of the grooves 168 (width and depth), among other factors. In general, the efficiency of the lens structure 116 increases as the incoming electromagnetic radiation approximates the target wavelength of the lens. In this way, the lens structure 116 is configurable to be sensitive to a particular wavelength or a range of wavelengths, instead of being sensitive to all wavelengths of electromagnetic radiation in general. In one embodiment, the bolometer sensor assembly 100 includes a lens layer 114 having a plurality of differently configured lens structures 116 to enable the semiconductor device to be sensitive to more than one desired wavelength or more than one range of wavelengths.

Figure 13:
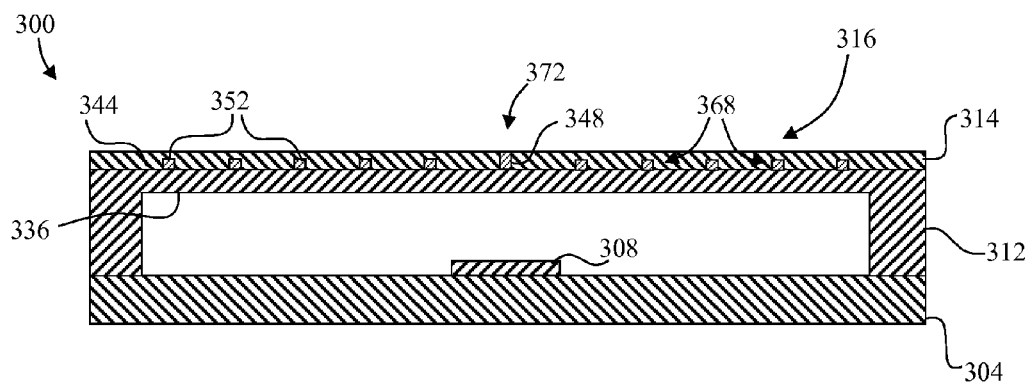
FIG. 13 is a side cross sectional view of another embodiment of a semiconductor sensor device, as described herein, taken along line XIII-XIII of FIG. 14, the semiconductor sensor device including a bolometer pixel and a lens structure defining a plurality of concentric grooves and an IR opening.
Figure 14:
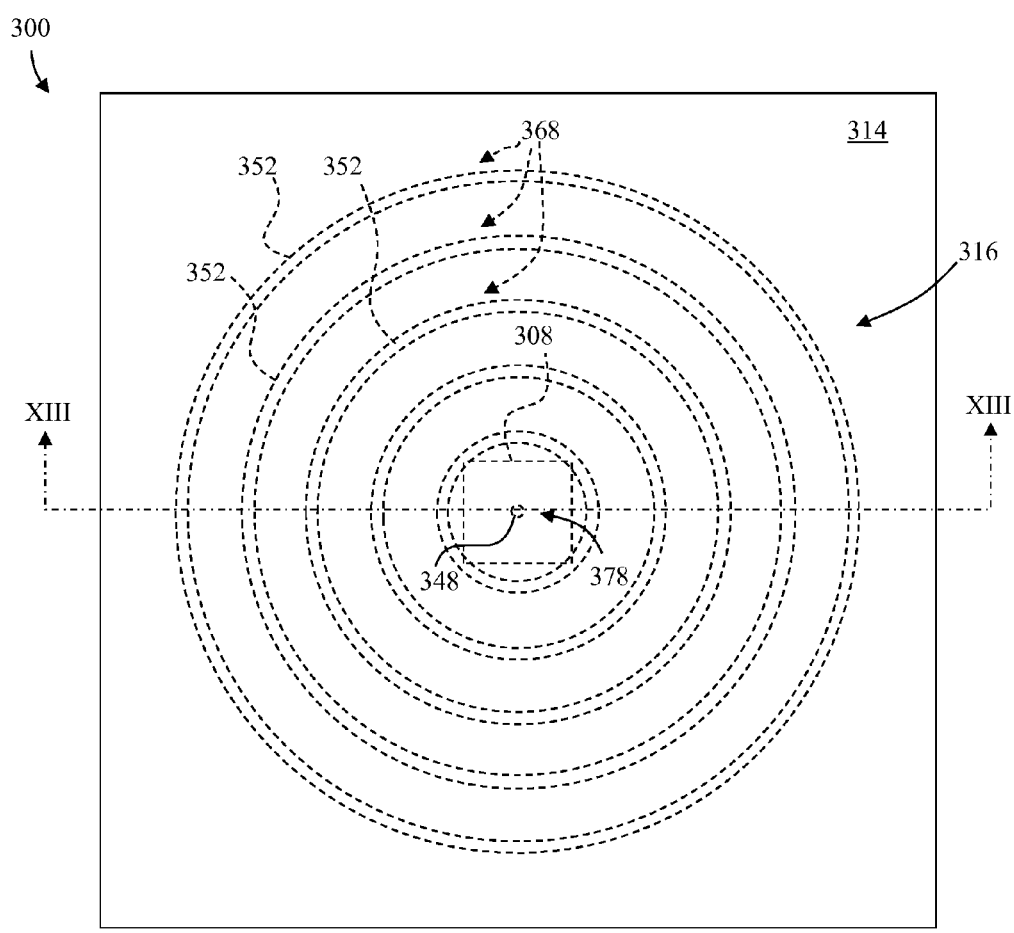
FIG. 14 is a top plan view of the semiconductor sensor device of FIG. 13, showing the plurality of concentric grooves and the bolometer pixel in broken lines.

As shown in FIGS. 13 and 14, another embodiment of a bolometer sensor assembly 300 includes a substrate 304, a plurality of bolometer pixels 308 (only one of which is shown), a cap wafer 312, and a plurality of lens structures 316 (only one of which is shown) formed in a lens layer 314. A post 348 and a plurality of ridges 352 and are formed on an upper surface 344 of a cap layer 336 of the cap wafer 312. The lens structure 316 defines an aperture 372 in which the post 348 is located, and a plurality of grooves 368 that is substantially/completely filled with the ridges 352.

The bolometer sensor assembly 300 is substantially identical to the bolometer sensor assembly 100, except that the post 348 and the ridges 352 are formed from a material that is different than the material of the cap wafer 312. The material of the post 348 and the ridges 352 is deposited into trenches formed in a sacrificial layer (See e.g. grooves 184 formed in the sacrificial layer 180 of FIG. 8) using any commonly used deposition technique including evaporation, sputtering, and ALD among others.

The post 348 and the ridges 352 may be formed from a material having a refractive index that is close to the refractive index of air. The wavelength of the electromagnetic radiation (typically IR) that the lens structure 316 is configured to efficiently focus through the aperture 372 is based on the material from which the post 348 and the ridges 352 is formed. Accordingly, by selecting a material with a particular index of refraction the lens structure 316 is "tuned" to a desired wavelength of electromagnetic radiation.

Figure 15:
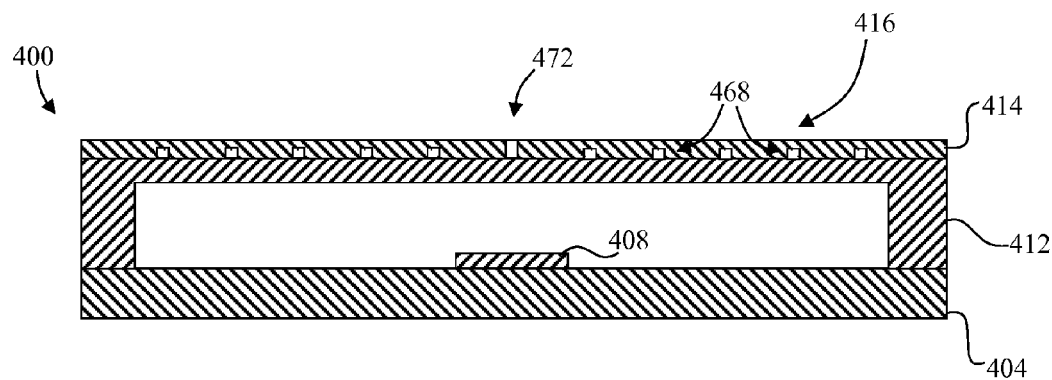
FIG. 15 is a side cross sectional view of another embodiment of a semiconductor sensor device, as described herein, taken along line XV-XV of FIG. 16, the semiconductor sensor device including a bolometer pixel and a lens structure defining a plurality of concentric grooves and an IR opening.
Figure 16:
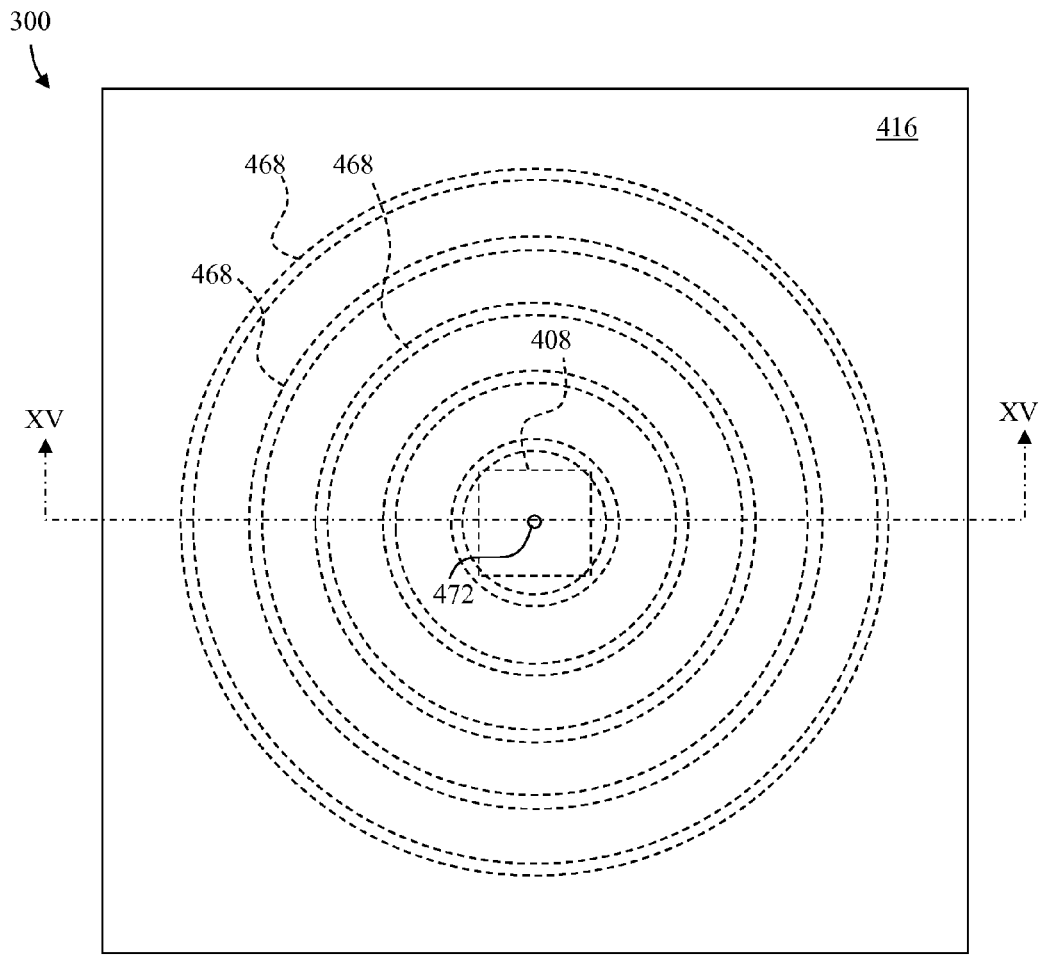
FIG. 16 is a top plan view of the semiconductor sensor device of FIG. 15, showing the plurality of concentric grooves and the bolometer pixel in broken lines.

As shown in FIGS. 15 and 16, another embodiment of a bolometer sensor assembly 400 includes a substrate 404, a plurality of bolometer pixels 408 (only one of which is shown), a cap wafer 412, and a plurality of lens structures 416 (only one of which is shown). The lens structure 416 defines an aperture 472 and a plurality of grooves 468.

The bolometer sensor assembly 400 is substantially identical to the bolometer sensor assembly 100, except that the bolometer sensor assembly 400 does not include a post 148 or the ridges 152. Instead, the grooves 468 and the aperture 472 are gas-filled/air-filled voids. The type of gas(es) in the gas-filled 468, 472 voids is selectable to have a desired index of refraction to enable "tuning" of the lens structure 416.

In one embodiment, the grooves 468 and the aperture 472 of the bolometer sensor assembly 400 are formed similarly to the grooves 168 and the IR opening 172 of the semiconductor device 100. Instead of forming the post 148 and the ridges 152 from the material of cap wafer 112, however, the post 148 and the ridges 152 are formed form a thermally decomposable sacrificial polymer such as "Unity" or a photo-definable material. The thermally decomposable material of the post 148 and the ridges 152 is deposited using any commonly used deposition technique including evaporation, sputtering, and atomic layer deposition among others. A thermally decomposable sacrificial polymer is a material that is selectively removable from the bolometer sensor assembly 100 in response to being heated to a predetermined temperature. The bolometer sensor assembly 400 is heated to approximately 300 to 400 degrees Celsius, for example, in order to evaporate/decompose the thermally decomposable sacrificial polymer. Upon being heated, the thermally decomposable sacrificial polymer evaporates through the material of the lens structure 416 and/or through the material of the cap wafer 412. Evaporation of the material of the post 148 and the ridges 152 leaves behind the air-filled grooves 468 and the aperture 472.

Figure 17:
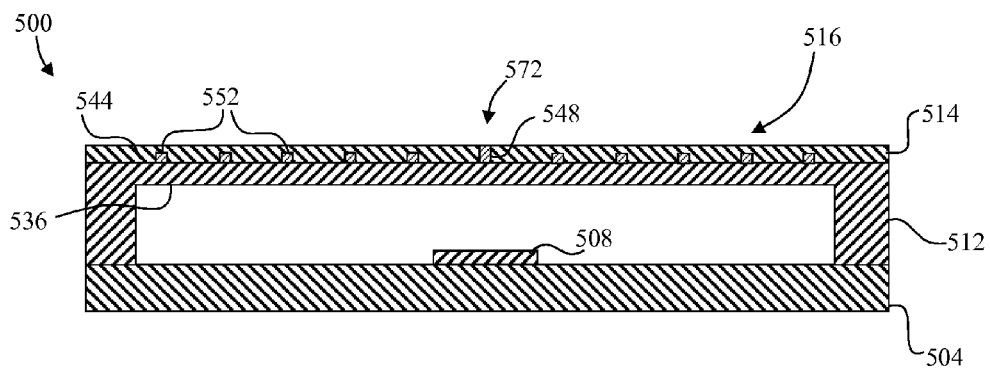
FIG. 17 is a side cross sectional view of another embodiment of a semiconductor sensor device, as described herein, taken along line XVII-XVII of FIG. 18, the semiconductor sensor device including a plurality of bolometer pixels and a lens structure defining a plurality of linear grooves and an IR opening.
Figure 18:
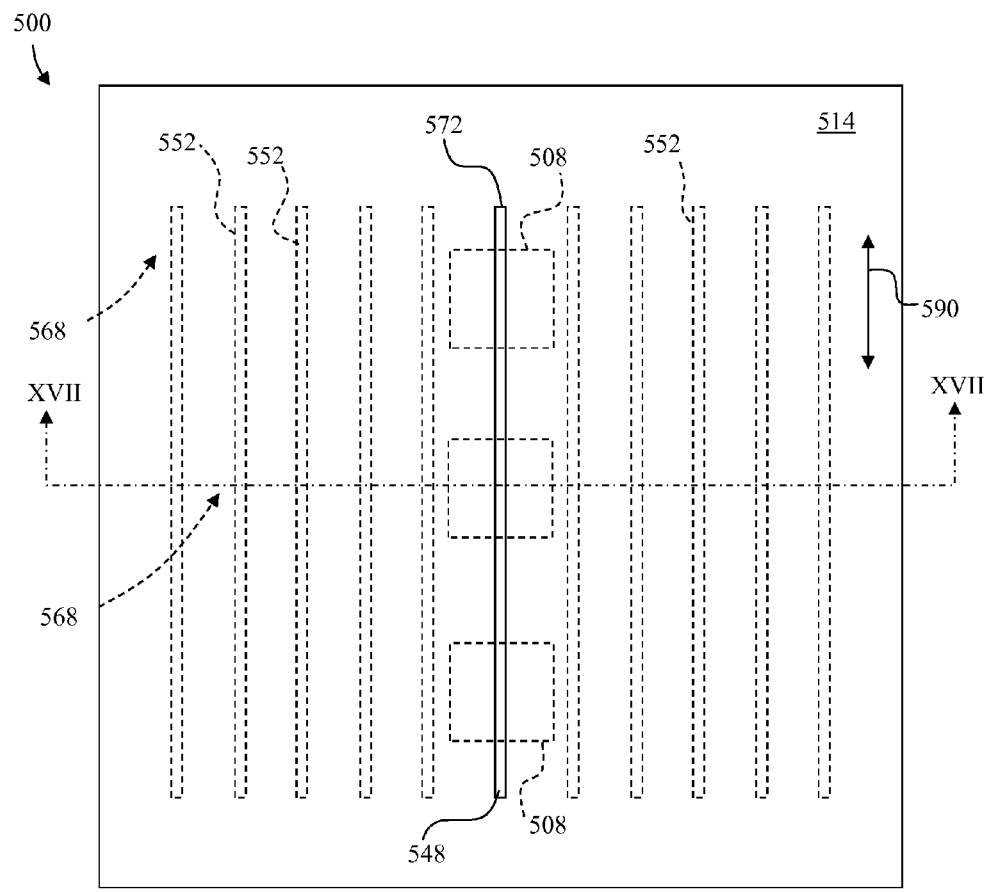
FIG. 18 is a top plan view of the semiconductor sensor device of FIG. 17, showing the plurality of linear grooves and the plurality of bolometer pixels in broken lines.

As shown in FIGS. 17 and 18, another embodiment of a bolometer sensor assembly 500 includes a substrate 504, a plurality of bolometer pixels 508 (only three of which are shown), a cap wafer 512, and lens layer 514 includes a plurality of lens structures 516 (only one of which is shown). An aperture ridge 548 and a plurality of ridges 552 and are formed on an upper surface 544 of a cap layer 536 of the cap wafer 512. The lens structure defines a slit 572 (also referred to herein as an opening, an aperture opening, and an aperture) in which the aperture ridge 548 is located, and a plurality of grooves 568 that is substantially/completely filled with the ridges 552.

The bolometer sensor assembly 500 is substantially identical to the bolometer sensor assembly 100, except that the grooves 568 and the aperture 572 are substantially linear and extend in a slit direction 590 instead of being circular. The lens structure 516 functions substantially similarly as the lens structure 116 to focus/beam the IR (see IR 120 of FIG. 4) onto the bolometer pixels 508.

Figure 19:
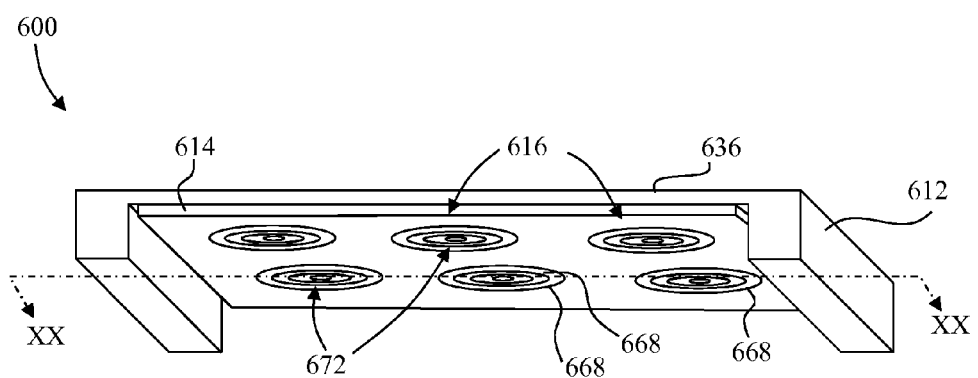
FIG. 19 is a perspective view of an embodiment of a semiconductor sensor device, as described herein, that includes a lens layer formed on an underside of a cap wafer, the lens layer is shown as defining six lens structures.
Figure 20:
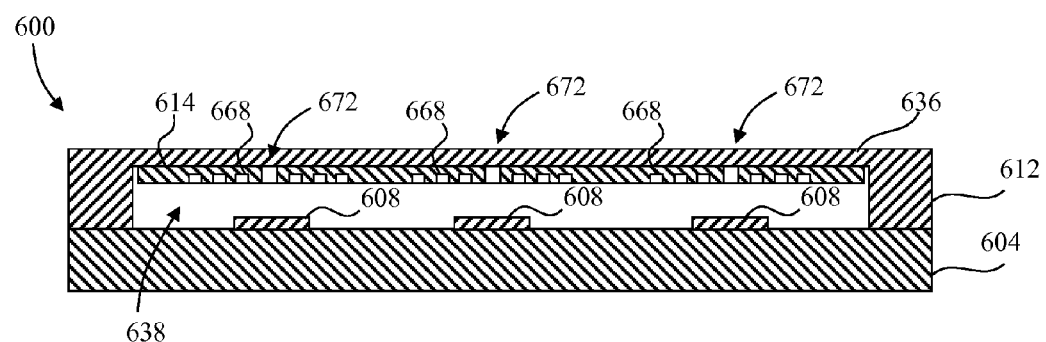
FIG. 20 is a side cross sectional view taken along the line XX-XX of FIG. 19.

As shown in FIGS. 19 and 20, another embodiment of a bolometer sensor assembly 600 includes a substrate 604, a plurality of bolometer pixels 608 (only three of which are shown), a cap wafer 612, and a lens layer 614 defining a plurality of lens structures 616 (only six of which are shown). Each of the lens structures 616 defines an aperture 672 and a plurality of grooves 668.

The bolometer sensor assembly 600 is substantially identical to the bolometer sensor assembly 400, except that the lens layer 614 (and the lens structures 616 formed thereon) is located in a cavity 638 defined between the substrate 604 and a cap layer 636 of the cap wafer 612. Since the lens structures 616 are positioned on an "underside" of the cap layer 636 the IR (see IR 120 of FIG. 4) passes through the cap layer before being focused by the lens structures 616.

Figure 21:
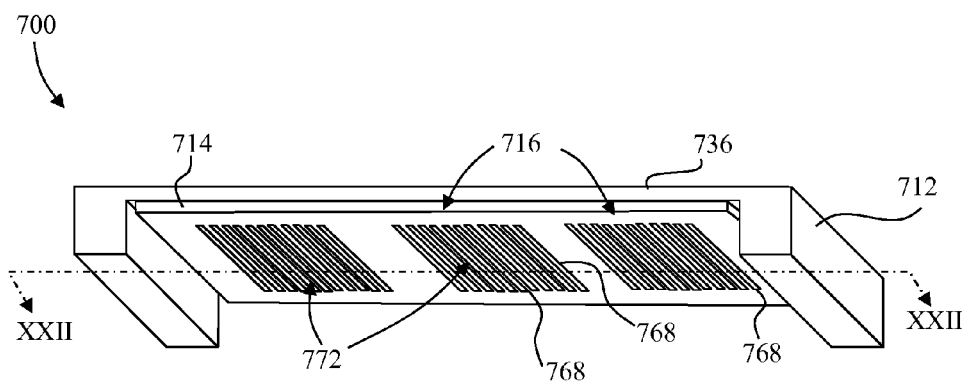
FIG. 21 is a perspective view of an embodiment of a semiconductor sensor device, as described herein, that includes a lens layer formed on an underside of a cap wafer, the lens layer is shown as defining three lens structures.
Figure 22:
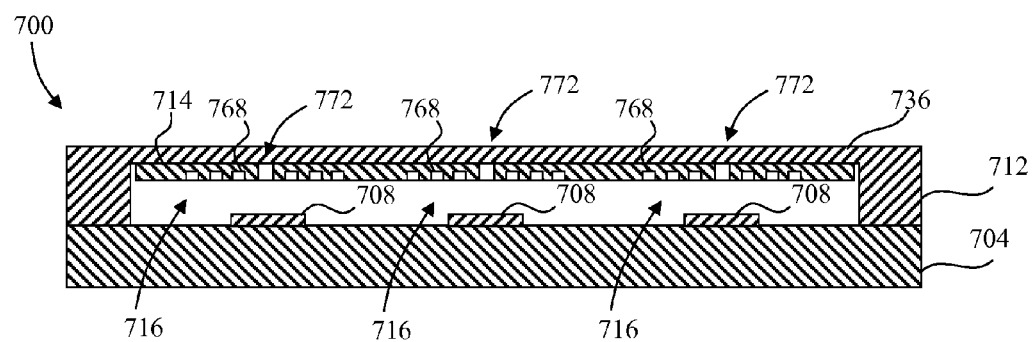
FIG. 22 is a side cross sectional view taken along the line XXII-XXII of FIG. 21.

As shown in FIGS. 21 and 22, another embodiment of a bolometer sensor assembly 700 includes a substrate 704, a plurality of bolometer pixels 708 (only three of which are shown), a cap wafer 712, and a lens layer 714 defining a plurality of lens structures 716 (only three of which are shown). Each of the lens structures 716 defines a slit-shaped aperture 772 and a plurality of substantially linear grooves 768.

The bolometer sensor assembly 700 is substantially identical to the bolometer sensor assembly 500, except that the lens structures 716 are located between the substrate 704 and a cap layer 736 of the cap wafer 712. Since the lens structures 716 are positioned on an "underside" of the cap layer 736 the IR (see IR 120 of FIG. 4) passes through the cap layer before being focused by the lens structures 716.

Figure 24:
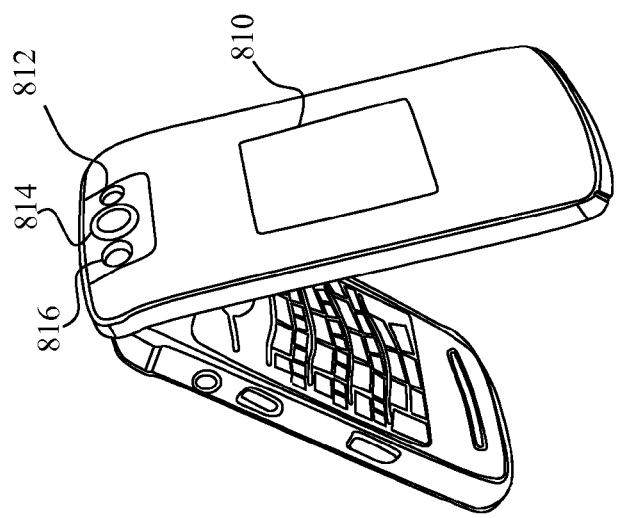
FIGS. 23 and 24 depict perspective views of one embodiment of a portable device in which the subject disclosure is used.
Figure 23:
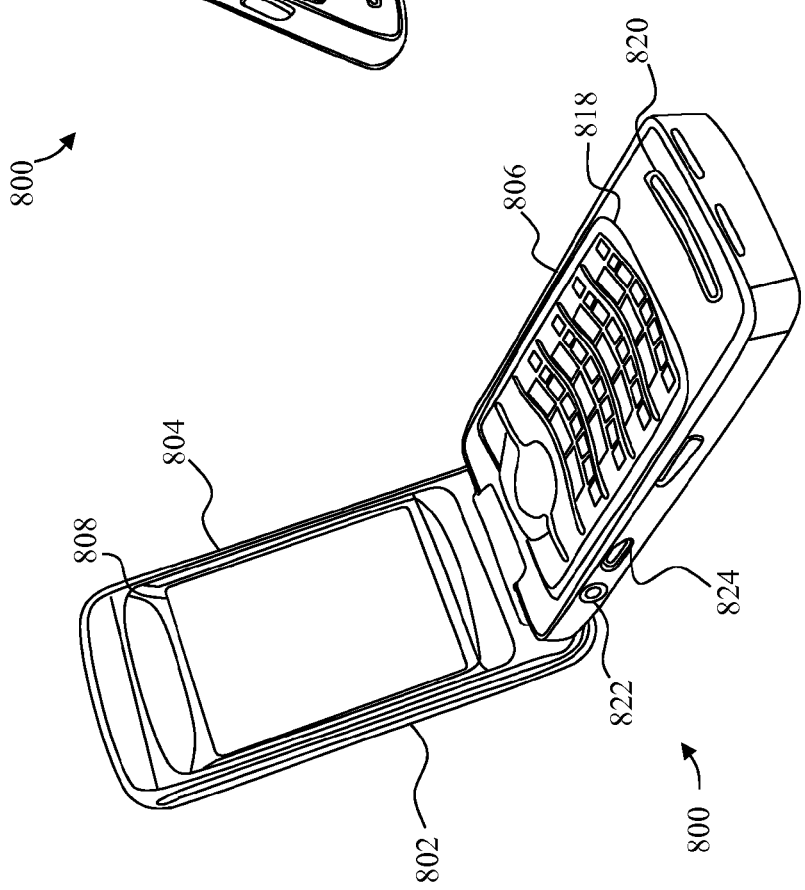

While many of the embodiments discussed above depicted and made reference to only one pixel, the single pixel in various embodiments is replaced by an array of pixels. For example, each of the pixel 108, the pixel 308, and the pixel 408, in various embodiments, is provided as an array of pixels. Such an array is provided in some embodiments in a portable device such as the portable device of FIGS. 23 and 24, generally designated 800, which in this embodiment is a cellular telephone. In some embodiments, the portable device is a personal digital assistant, a smart phone, a dedicated sensor device, or other desired portable device. The portable device 800 has a housing 802 that includes an upper housing portion 804 and a lower housing portion 806. An inner display 808 is located on the inner side of the upper housing portion 804 and an outer display 810 is located on the outer side of the upper housing portion 804 as depicted in FIG. 24. The outer side of the upper housing portion 804 further includes a thermal sensor assembly port 812, a camera port 814 and a light port 816.

Referring again to FIG. 23, the lower housing portion 806 includes a keyboard 818 and a microphone port 820. A data port 822 and a charging port 824 are located on the side of the lower housing portion 806.

Figure 25:
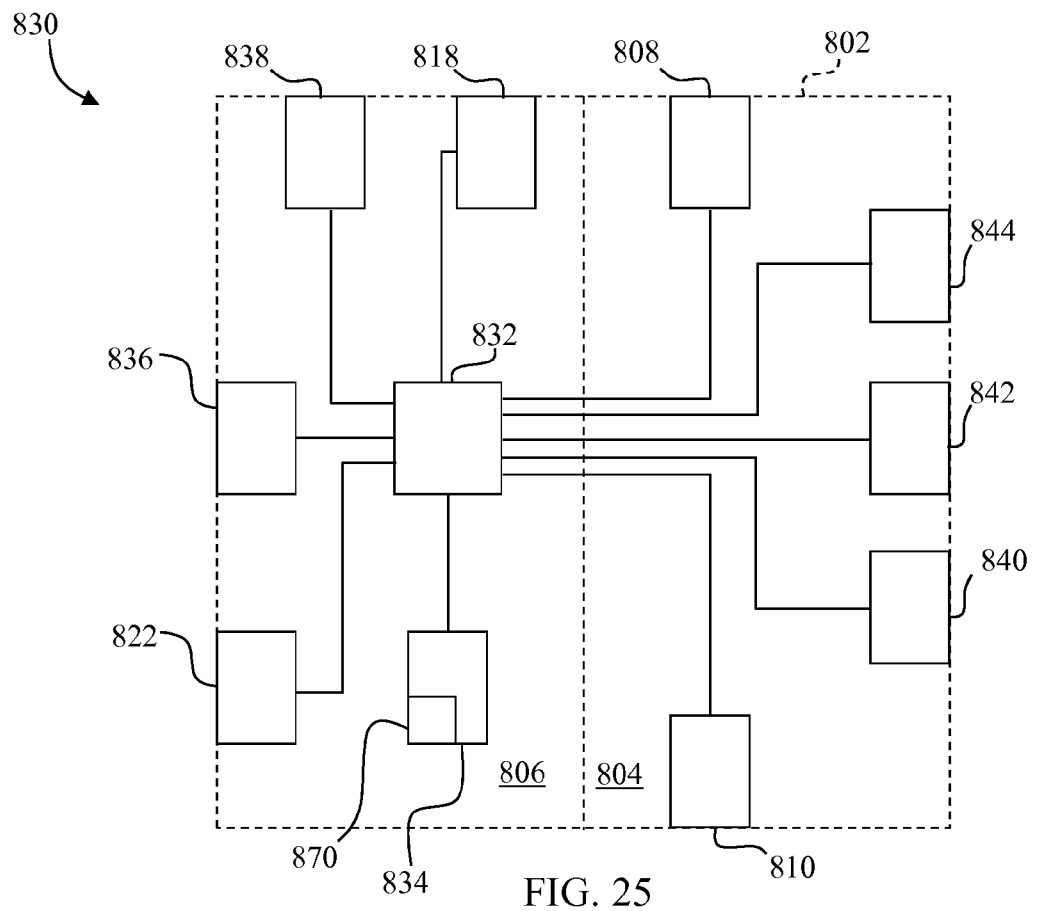
FIG. 25 depicts a block diagram of the components of the portable device of FIG. 23.

FIG. 25 depicts a control circuit 830 which is located within the housing 802. The control circuit 830 includes a processor 832 and a memory 834 which in this embodiment are located within the lower housing portion 806. The processor 832 is operably connected to the keyboard 818 and the data port 822. The processor 832 is further operably connected to a power source 836 which is accessed through the charging port 824 and a microphone 838 positioned adjacent to the microphone port 820.

The processor 832 is also operably connected to components in the upper housing portion 804 including the inner display 808 and the outer display 810. The processor 832 is further operably connected to a bolometer sensor assembly 840, a charge coupling device (CCD) 842 and a light 844 which are physically located adjacent to the sensor assembly port 812 and are part of an imaging subsystem, the camera port 814 and the light port 816, respectively.

Figure 26:
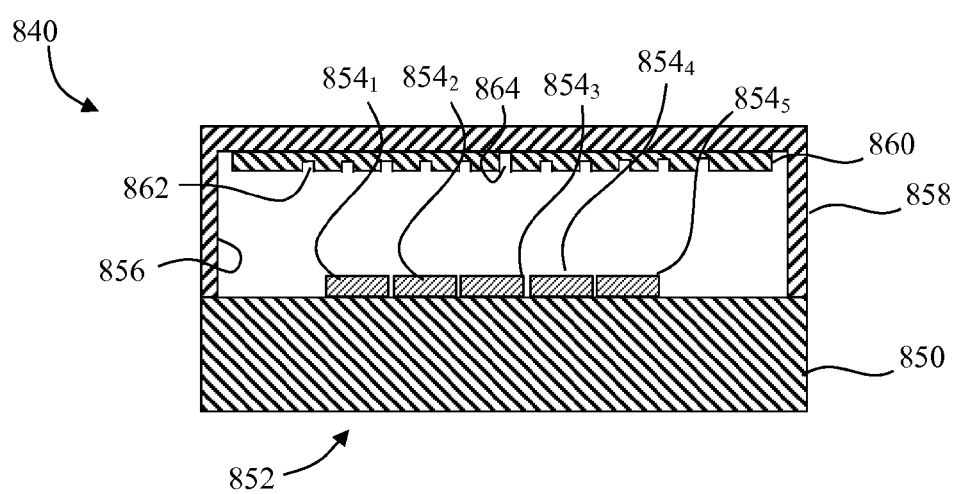
FIG. 26 depicts a side cross-sectional view of the sensor assembly of FIG. 25.

The bolometer sensor assembly 840 is shown in further detail in FIG. 26. The bolometer sensor assembly 840 includes a substrate 850 and an array 852 of thermal sensors 854$_{1-5}$. The array 852 is located within a chamber 856 defined in part by a cap 858. A plasmonic lens 860 is connected to the underside of the cap 858. In various embodiments, the location and configuration is provided in the manner described above for the lenses 116, 316, 416, 516, and 716. In the embodiment of FIG. 26, the plasmonic lens 860 includes one lens structure which is substantially identical to the plasmonic lens structures 616 of FIG. 19, and focuses and/or beams IR incident on the cap 858, much like an optical lens focuses and/or beams electromagnetic radiation in the visible spectrum. The plasmonic lens 860 is made of a "perfectly conducting layer", such as any type of metal, for example.

Like the lenses 616, the plasmonic lens 860 includes a number of concentric grooves 862 and a central aperture 864. The plasmonic lens 860 includes in various embodiments from about five up to about 50 concentric grooves 862, which may also be referred to as surface corrugations. The central aperture 864 is generally circular and extends completely through the plasmonic lens 860.

The plasmonic lens 860 is connected to the cap wafer 858 with the grooves 862 facing away (i.e. spaced apart from) from the cap wafer. The cap wafer 858, which is imperforate in this embodiments, does not include an opening aligned with the aperture 864. Accordingly, visible light does not pass through the cap wafer 858; however, as described above, most of the IR passes through the cap wafer.

Returning to FIG. 25, within the memory 834 are stored program instructions 870. The program instructions 870, which are described more fully below, are executable by the processor 832 and/or any other components as appropriate. The program instructions 870 include commands which, when executed by the processor 832, cause the portable device 800 to obtain data for use in determining the temperature of an object within a field of view of the sensor assembly 840.

Figure 27:
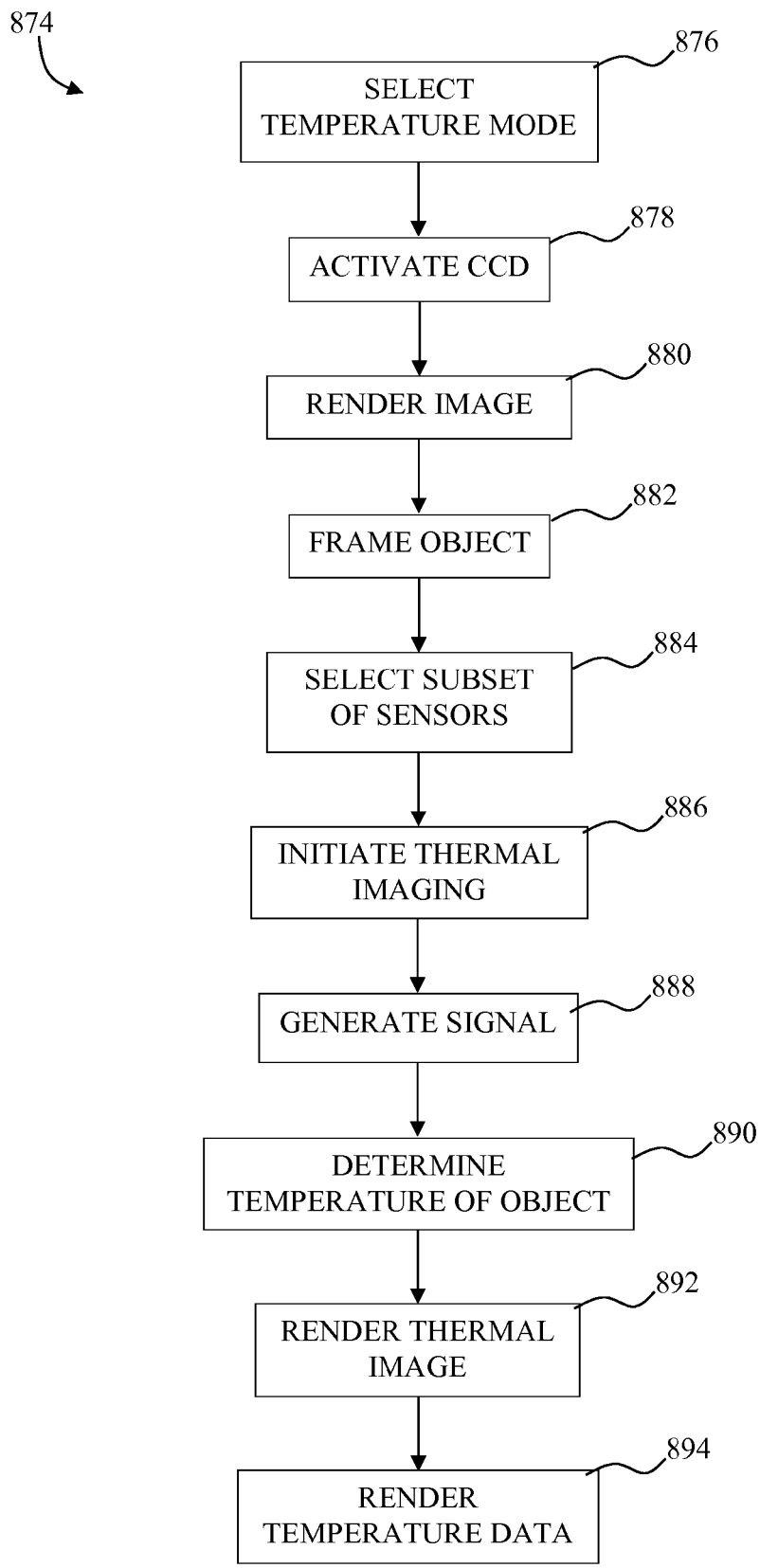
FIG. 27 depicts a procedure for obtaining data for obtaining a thermal image and determining the temperature of an object using the portable device of FIGS. 23 and 24.

Referring to FIG. 27, there is depicted a flowchart or a process, generally designated 874, setting forth an exemplary manner of obtaining data for use in obtaining a thermal image and/or determining the temperature of an object within a field of view of the sensor assembly 840 by executing the program instructions 870 according to the present principles. Initially, a user carrying the portable device 800 opens the housing 802 to the position shown in FIG. 23 and uses the keyboard 818 to place the portable device 800 in temperature imaging mode (block 876). In embodiments which are configured solely for temperature detection, solely for thermal imaging, or for both thermal detection and imaging, the device may only need to be energized. In embodiments such as the portable device 800, the display 808 in some embodiments is configured to render a menu which the user uses to activate the temperature detection mode.

Once the portable device 800 is placed in temperature detection mode, the processor 832 controls the CCD 842 to an energized condition (block 878). In response, the CCD 842 begins to detect incoming energy in any acceptable manner and generates a signal indicative of the sensed energy. The processor 832 receives the generated signal and controls the inner display 808 to render the scene viewed (sensed) by the CCD 842 (block 880).

Using the rendered image as a guide, the user frames the desired scene/object (block 882). Framing of the object in some embodiments is accomplished by zooming the display such that the object fills the display 808. In other embodiments, a shadow frame overlying the viewed scene is manipulated to frame the object. As the object is framed using the inner display 808, the processor 832 in some embodiments selects a subset of the thermal sensors 854$_{1-5}$ in the array 852. By varying the number of active pixels (each of the thermal sensors 854$_{1-5}$ is a separate pixel), the field of view (FOV) of the sensor assembly 840 is adjusted to comport with the framing of the object in the display 808 (block 884). Once the object is framed, the user initiates thermal data acquisition (block 886) such as by pressing a key in the keyboard 818. In response, the processor 832 controls the array 852 to generate a respective signal from each of the selected thermal sensors 154$_{1-5}$ (block 888).

In some embodiments, the CCD 842 is omitted or not used and the array 852 is used to provide an image. In such embodiments, blocks 878-882 are omitted and the processor 832 or an ASIC included with the device, is configured to generate data that forms an output thermal image. In either embodiment, the ASIC or processor 832 is configured to process the electrical signal(s) generated by each of the bolometer pixels 854. In particular, based on the resistance of the bolometer pixels 854, the processor 832 generates data that corresponds to thermal information contained in the focused ray.

Each IR data point is then assigned a color in the visual spectrum based on the intensity of the IR sensed by the corresponding bolometer pixel 854 (or group of bolometer pixels) (block 890). Typically, "high" intensities of IR receive a light color such as white and "low" intensities of IR receive a dark color such as blue or black. Additionally, each IR data point is assigned a temperature value, which is also based on the intensity of the IR sensed by the corresponding bolometer pixel 854 (or group of bolometer pixels). The visual spectrum data is then rendered (block 892).

Figure 28:
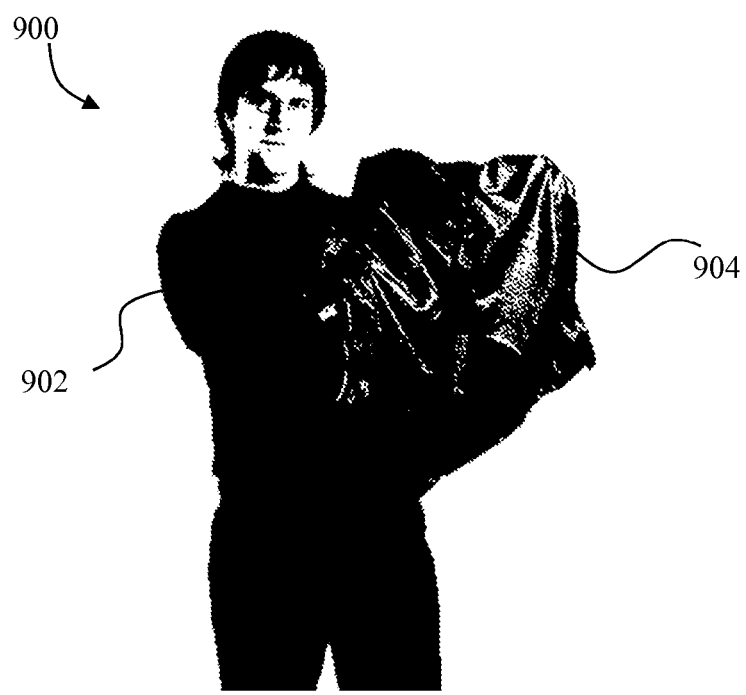
FIG. 28 depicts the display of FIG. 23 wherein data from a CCD is rendered on the display.
Figure 29:
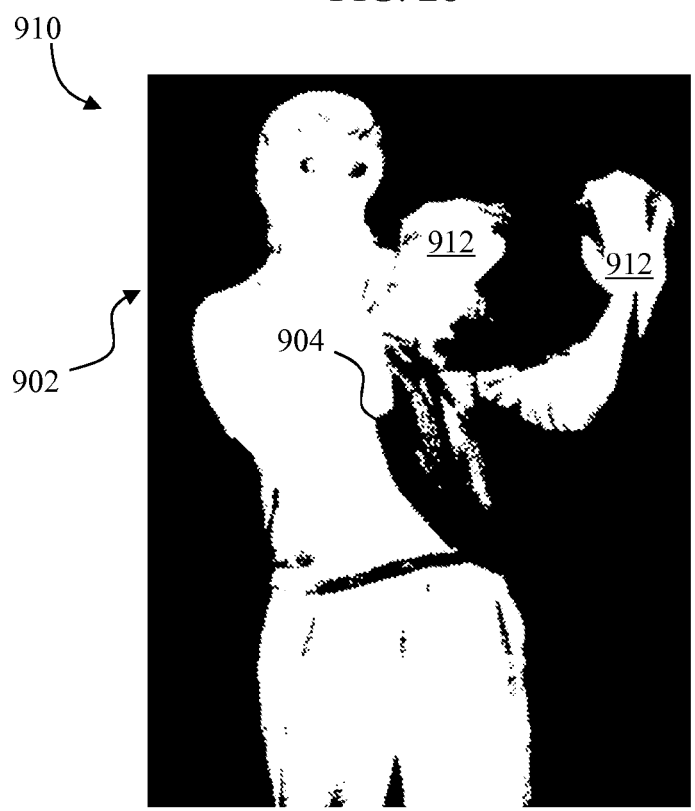
FIG. 29 depicts the display of FIG. 23 wherein data from the bolometer array is rendered on the display.

By way of example, FIG. 28 depicts an exemplary image 900 from the CCD 842 rendered on the display 808 at block 880. In the image 900, an individual 902 and a bag 904 are visible. FIG. 29 depicts an exemplary image 910 from the array 852 of the same individual 902 rendered on the display 808 at block 892. As shown in FIG. 29, the output thermal image 910 shows the hands 912 of the individual 902 which are not detectable by the CCD 842. In the embodiment of FIG. 29, the display 808 is a touchscreen. Consequently, when a user touches the touchscreen display 808, the processor 832 receives touch input from the display 808 and causes the temperature data associated with the color data which is rendered at a location of the display which was touched to be displayed. Consequently, the temperature data associated with that region of the output thermal image 910 which is touched is displayed (block 894). Accordingly, the user is able to determine the temperature of a particular portion the image 900 or the image 910 by simply touching the corresponding region of the output thermal image 910 on the touchscreen display 808.

In one embodiment, the array 852 includes approximately one thousand bolometer pixels 854 positioned on the substrate layer 850 and arranged in a focal plane array ("FPA"). For clarity of viewing, however, only five bolometer pixels 854 are illustrated in FIG. 26. In another embodiment, the array 852 includes between 500 and 100,000 of the bolometer pixels 854.

The bolometer pixels 854 are arranged on the substrate layer 850 in a position to receive a focused ray from the lens 860. In one embodiment, the pixels 854 are arranged in a generally rectangular shaped array. In another embodiment, the bolometer pixels 854 are arranged in a differently shaped array, such as an array having a shape that matches (at least approximately) the shape of a focused ray incident on the substrate layer 850. Furthermore, the bolometer pixels 854 may be arranged in an array having any other shape as desired by those of ordinary skill in the art. Additionally, the bolometer pixels are arranged according to a Cartesian coordinate system, such that each bolometer pixel 854 in the focal plane array has a unique address on the substrate layer 850. In another embodiment, the bolometer pixels 854 are arranged according to any other coordinate system that enables each bolometer pixel to have a unique address on the substrate layer 850.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A portable thermal imaging system comprising:
a portable housing configured to be carried by a user;
a bolometer sensor assembly supported by the housing and including an array of thermal sensor elements and at least one plasmonic lens;
a memory including program instructions;
a processor operably connected to the memory and to the sensor, and configured to execute the program instructions to
obtain signals from each of a selected set of thermal sensor elements of the array of thermal sensor elements,
assign each of the obtained signals with a respective color data associated with a temperature of a sensed object, and
render the color data; and
an imaging subsystem including a display, the imaging subsystem operably connected to the processor, wherein the processor is further configured to execute the program instructions to render indicia of a field of view of the bolometer sensor assembly on the display, wherein the bolometer sensor assembly further comprises:
a substrate having an upper surface supporting the array of thermal sensor elements; and
a cap wafer supported by the substrate and including a cap layer spaced apart from the substrate, the cap layer supporting the at least one plasmonic lens.

2. The system of claim 1, wherein the processor is further configured to execute the program instructions to:
receive touch input from a display upon which the color data is rendered; and
render the temperature associated with the color data which is rendered at a location of the display which is touched.

3. The system of claim 1, wherein the portable housing is a portable cellular telephone housing.

4. The system of claim 1, wherein:
the selected set of thermal sensor elements is selected based upon a user input; and
the rendered indicia of the field of view is based upon the user input.

5. The system of claim 1, wherein the at least one plasmonic lens comprises:
a plurality of grooves in a lens layer, and an opening extending completely through the lens layer.

6. The system of claim 5, wherein the plurality of grooves comprise:
a plurality of concentric grooves.

7. The system of claim 6, wherein the opening is a circular opening.

8. The system of claim 6, wherein the lens layer is supported on an upper surface of the cap layer.

9. The system of claim 8, wherein:
the cap wafer is formed from a first material, and
the plurality of concentric grooves is at least partially filled with the first material.

10. The system of claim 9, wherein:
the first material is silicon; and
the lens layer is formed of a metal material.

11. A portable thermal imaging system comprising:
a portable housing configured to be carried by a user;
a bolometer sensor assembly supported by the housing, and including a substrate having an upper surface supporting an array of thermal sensor elements and a cap wafer directly supported by the upper surface and including a cap layer spaced apart from the substrate, the cap layer supporting at least one plasmonic lens;
a memory including program instructions; and
a processor operably connected to the memory and to the sensor, and configured to execute the program instructions to
obtain signals from each of a selected set of thermal sensor elements of the array of thermal sensor elements,
assign each of the obtained signals with a respective color data associated with a temperature of a sensed object, and
render the color data.

12. The system of claim 11, wherein the at least one plasmonic lens comprises:
a plurality of grooves in a lens layer, and an opening extending completely through the lens layer.

13. The system of claim 12, wherein the plurality of grooves comprise:
a plurality of concentric grooves.

14. The system of claim 13, wherein the lens layer is supported on an upper surface of the cap layer.

15. The system of claim 14, wherein:
the cap wafer is formed from a first material, and
the plurality of concentric grooves is at least partially filled with the first material.

16. The system of claim 15, wherein the portable housing is a portable cellular telephone housing.

* * * * *